United States Patent Office 3,772,444
Patented Nov. 13, 1973

---

3,772,444
5-ARYL AND HETEROARYLPHENYL SULFONIC ACIDS TO TREAT INFLAMMATION
Lewis H. Sarett, Skillman, and John Hannah, Matawan, N.J., assignors to Merck & Co., Inc., Rahway, N.J.
No Drawing. Application Apr. 20, 1970, Ser. No. 30,325, now Patent No. 3,691,185, which is a continuation-in-part of application Ser. No. 836,610, June 25, 1969, now Patent No. 3,714,232. Divided and this application July 10, 1972, Ser. No. 270,347
Int. Cl. A61k 27/00
U.S. Cl. 424—311
4 Claims

ABSTRACT OF THE DISCLOSURE 5-aryl and heteroarylphenyl sulfonic acids and their derivatives are described and the processes for preparing the same are disclosed. These compounds exhibit anti-inflammatory properties and also possess an effective degree of anti-pyretic and analgesic activity.

CROSS REFERENCES TO RELATED APPLICATIONS

This is a division of Ser. No. 30,325, filed Apr. 20, 1970, now U.S. Pat. No. 3,691,185, which is a continuation-in-part of Ser. No. 836,610, filed June 25, 1969, now U.S. Pat. No. 3,714,232.

BACKGROUND OF THE INVENTION

There has been much emphasis during the past two decades to synthesize anti-inflammatory compounds. Many of those agents developed have been highly effective steroids, but are complex in structure. The most desirable anti-inflammatory agent should be relatively active and simple in structure.

SUMMARY OF THE INVENTION

This invention is new 5-aryl and heteroaryl phenyl sulfonic acid compounds and their derivatives, as well as the processes for preparing these compounds and their use as medicinal agents. In particular, new 5-aryl and heteroaryl-2-hydroxyphenyl sulfonic acids and derivatives are the object of this invention. We have found that the compounds of this invention contain a useful degree of anti-inflammatory activity and effectively prevent and inhibit edema and granuloma tissue formation. These compounds further contain a moderate degree of anti-pyretic and analgesic activity.

DESCRIPTION OF THE PREFERRED EMBODIMENTS

New 5-aryl and heteroaryl phenyl sulfonic acid compounds and their derivatives are described in this invention. More specifically, this invention describes new 5-aryl and heteroaryl-2-hydroxyphenyl sulfonic acid derivatives and further relates to the non-toxic pharmaceutically acceptable salts, esters and amides of the sulfonic acids, as well as the various ether derivatives. Included also in this invention are their methods of preparation and their treatment as medicinal agents.

In a more narrow aspect, the present invention embraces those compounds having the following structural Formula I

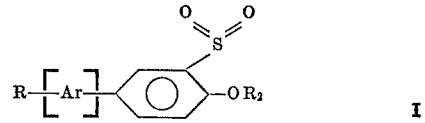

where

Ar is any benzenoid or non-benzenoid aromatic-like structure (preferably phenyl, styryl, naphthyl, etc.) containing one or more R substituents which may be at any position on the ring (preferably at the 2, 4 and 6-positions), or a heteroaryl structure (preferably pyridyl or thienyl);

R is hydrogen, alkyl (preferably lower alkyl such as methyl, ethyl, propyl, i-propyl, etc.), alkenyl (preferably lower alkenyl such as vinyl, allyl, etc.), halogen (preferably fluoro and chloro), haloalkyl (preferably halolower-alkyl such as trifluoromethyl), hydroxy, alkoxy (preferably lower alkoxy such as methoxy, ethoxy, etc.), nitro, amino, alkylamino (preferably lower alkylamino such as methylamino, ethylamino, etc.), dialkylamino (preferably dilower alkylamino such as dimethylamino, methylethylamino, etc.), alkylthio (preferably lower alkylthio such as methylthio, ethylthio, etc.), alkylsulfonyl (preferably lower alkylsulfonyl such as methylsulfonyl), alkylsulfonyl (preferably lower alkylsulfenyl such as methylsulfenyl) and sulfamyl;

$R_1$ is

—OH,

—OM where M in general is any base which will form an acid addition salt with a sulfonic acid and whose pharmacological properties will not cause an adverse physiological effect when ingested by the body system (preferably an alkali, alkaline earth or aluminum metal such as sodium, potassium, calcium, magnesium and aluminum metals), —OR′ where R′ is alkyl (preferably lower alkyl such as methyl, ethyl, propyl, i-propyl, etc.), aryl (preferably mononuclear aryl such as phenyl, tolyl, xylyl, etc.), aralkyl (preferably arlower alkyl such as benzyl, phenethyl, etc.),

where $R_3$ and $R_4$ are hydrogen, alkyl (preferably lower alkyl such as methyl, ethyl, propyl, etc.), cycloalkyl (preferably cyclolower alkyl such as cyclopropyl, cyclobutyl, etc.), aryl (preferably phenyl), aralkyl (preferably arlower alkyl such as benzyl, phenethyl, etc.); $R_3$ and $R_4$ may be the same or different and when taken together form a heterocyclic ring such as N-piperidino, N-morpholino, N-piperazino, N-homopiperazino, N-pyrrolidino, etc.; and $R_2$ is hydrogen, alkyl (preferably lower alkyl such as methyl, ethyl, propyl, i-propyl, etc.), aralkyl (preferably arlower alkyl such as benzyl, phenethyl, etc.), or acyl (preferably lower acyl such as formyl, acetyl, propionyl, butyryl, etc.).

The more preferred compounds of this invention embrace those compounds of the structural Formula I where Ar is phenyl or 4-pyridyl;
R is halo, diloweralkylamino or loweralkoxy;
$R_1$ is
—OH,
—OM,
—OR' where R' is lower alkyl,
—$NH_2$

where $R_3$ and $R_4$ are lower alkyl; and $R_2$ is hydrogen or acetyl.

The most preferred compounds of this invention embrace those compounds of the structural Formula I where Ar is phenyl; R is halo; $R_1$ is —OH and $R_2$ is hydrogen.

Representative compounds of this invention are as follows:

2-hydroxy-5-(p-fluorophenyl)phenyl sulfonic acid
2-acetoxy-5-(p-fluorophenyl)phenyl sulfonic acid
2-hydroxy-5-(p-methoxyphenyl)phenyl sulfonamide
sodio 2-acetoxy-5-(p-chlorophenyl)phenyl sulfonic acid
2-methoxy-5-(p-nitrophenyl)phenyl sulfonic acid
2-ethoxy-5-(o-methylphenyl)phenyl-N-phenyl sulfonamide
2-ethoxy-5-(α-naphthyl)phenyl-N-piperidino sulfonamide
2-acetoxy-5-(4'-pyridyl)phenyl sulfonic acid Various tests animals are carried out to show the ability of compounds to exhibit reactions that can be correlated with anti-inflammatory activity in humans. One such test used is the Carrageein testing method, which is known to correlate well with anti-inflammatory activity in humans and is a standard test used to determine anti-inflammatory activities. This is outlined in detail by C. A. Winter, Proc. Soc. Exptl. Biolog. & Med., 1962, III, 544. This test shows the correlation between clinically active compounds such as "Indocin," "Aspirin," "Butazolidin," "Tandearil," 'Cortone," "Hydrocortone," "Decadron" and those of unknown activity. In view of results from tests such as this, the compounds of this invention can be considered to be active anti-inflammatory agents.

We have found that the compounds described in this invention have anti-inflammatory activity and are effective in the prevention and inhibition of edema and granuloma tissue formation. In addition, they have a useful degree of anti-pyretic and analgesic activity. For these purposes, they may be administered orally, topically, parenterally or rectally. Orally, they may be administered in tablets or capsules, the optimum dosage depending on the particular compound being used and the type and severity of the condition being treated. Although the optimum quantities to be used will depend on the compound employed and the particular type of disease treated, oral dose levels of preferred compounds in the range of 0.5–30 mg./kg. (preferably in the range of 3–15 mg./kg. per day) are useful in control of arthritic conditions, depending on the activity of the specific compound and the reaction sensitivity of the patient. Comparable dosages may be used when the administration is topically, parenterally or rectally.

The compounds of the present invention have further been found to show diuretic, anti-fibrinolytic and hypoglycemic activity and when used for these utilities the same dosage ranges and conditions described above for anti-inflammatory activity will apply.

Sulfonation of a 4-aryl or heteroaryl phenol or its ether derivatives readily takes place at the ortho position using mild sulfonating conditions. One such suitable method is treatment with concentrated sulfuric acid at mild temperatures (preferably 15–50° C.). The alkoxy or aralkoxy groups may then be hydrolyzed back to the phenol by known methods such as with the use of boron trihalide, boron trichloride or trifluoride. It is preferred that the sulfonation take place on the isopropoxy derivative which is then easily hydrolyzed using mild conditions.

The 5-aryl or heteroaryl-2-hydroxyphenylsulfonic acid may then be acylated to prepare the desired 5-aryl or heteroaryl - 2 - acyloxyphenylsulfonic acids. One such method is by acylation with a suitable anhydride such as acetic anhydride in an aqueous alkaline solution to obtain 5-aryl or heteroaryl-2-acetoxyphenylsulfonic acids. These reactions may be illustrated by the following equations:

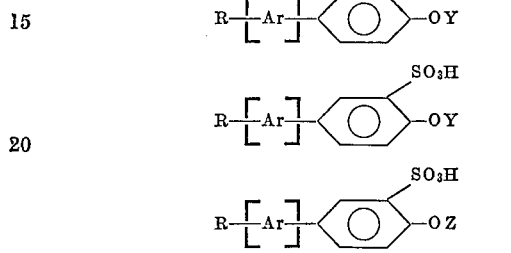

where Ar and R are as described above; Y is hydrogen, alkyl or aralkyl; and Z is acyl.

The sulfonic acid esters are conveniently prepared by reacting 5-aryl or heteroaryl-2-alkoxyphenyl sulfonyl halide with the proper alcohol of the formula R'OH. It is preferred to carry out this esterification in a basic medium such as anhydrous alcoholic alkaline or amine solution. The following equations illustrate these reactions:

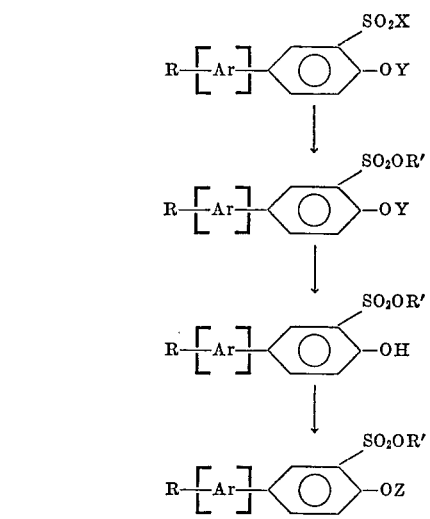

where Ar, R and OR' are as described above; Y is alkyl or aralkyl; Z is acyl; and X is halogen.

Direct halosulfonation is readily carried out with chloro or fluoro-sulfonic acid on the 4-aryl or heteroaryl phenyl alkyl ethers. This may be carried out in an organic solvent such as chloroform or carbon tetrachloride and at mild temperatures (preferably at —5°–30° C.). The 5-aryl or heteroaryl - 2 - alkoxyphenyl sulfonyl halide can then be treated with ammonia or with various substituted amines of the formula

to give the desired sulfonamide. If desired, the alkoxy group can be hydrolyzed back to the phenol by known methods (such as with boron trichloride or trifluoride) and then acylated (such as with a suitable anhydride) to the desired 5-aryl or heteroaryl-2-acyloxyphenyl sulfonamides. The following equations illustrate these reactions:

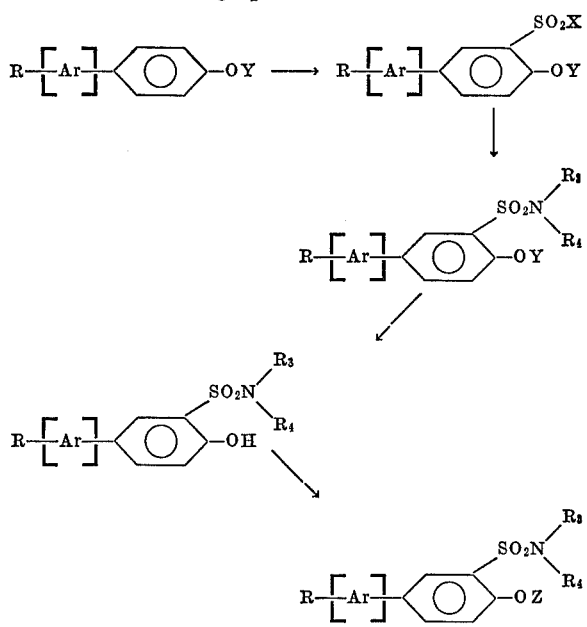

where Ar, R, $R_3$ and $R_4$ are as described above; Y is alkyl or aralkyl; Z is acyl; and X is halogen.

At various stages of synthesis one R substituent may be converted to another desired substituent by conventional method.

The 4-aryl and heteroaryl phenol starting materials of this invention are either known compounds or can be prepared by the following procedure. Reduction of known 4-aryl and heteroaryl nitrobenzene compounds to the corresponding aniline is carried out by conventional methods. This is then diazotized to the desired phenol, which can then be alkylated or acylated by known methods. A detailed description of this preparation follows.

Example I.—5-(p-fluorophenyl)-2-hydroxyphenyl sulfonic acid

Example I–1

4-(p-fluorophenyl)aniline.—To 10.9 of 4-(p-fluorophenyl)nitrobenzene in 350 ml. of ethanol is added 1.5 g. of platinum oxide and this is reduced over hydrogen. The reaction mixture is then filtered through a pad of filter cel and evaporated in vacuo to yield 4-(p-fluorophenyl)aniline.

4-(p-fluorophenyl)phenol.—A solution of 32.66 grams of 4-(p-fluorophenyl)aniline in 120 ml. of glacial acetic acid is cooled to 10–20° C. To this solution is added slowly a solution of 12.25 grams of sodium nitrite in 120 ml. of water with stirring and continued cooling. Five minutes after this addition, the suspension of the diazonium acetate is added slowly to a boiling solution of 100 ml. of concentrated sulfuric acid and 200 ml. of water. After the final addition of the diazonium salt, the suspension is boiled for an additional 5 minutes and then allowed to cool to room temperature. The reaction mixture is then filtered and the cake dried in vacuo to yield 4-(p-fluorophenyl)phenol (M.P. 152–161° C.).

When the compounds of Table I below are substituted for 4-(p-fluorophenyl)nitrobenzene in the above example, the corresponding phenol of Table II below is prepared.

TABLE I 4-(p-chlorophenyl)nitrobenzene
4-(2,6-dichlorophenyl)nitrobenzene
4-(p-bromophenyl)nitrobenzene
4-(o-methylphenyl)nitrobenzene
4-(3,4,5-trimethylphenyl)nitrobenzene
4-(p-methoxyphenyl)nitrobenzene
4-(p-dimethylaminophenyl)nitrobenzene
4-(p-trifluoromethylphenyl)nitrobenzene
4-(p-mercaptophenyl)nitrobenzene
4-(α-naphthyl)nitrobenzene
4-(styryl)nitrobenzene
4-(2-pyridyl)nitrobenzene
4-(3-pyridyl)nitrobenzene
4-(4-pyridyl)nitrobenzene
4-(2-thienyl)nitrobenzene
4-(3-thienyl)nitrobenzene

TABLE II 4-(p-chlorophenyl)phenol
4-(2,6-dichlorophenyl)phenol
4-(p-bromophenyl)phenol
4-(o-methylphenyl)phenol
4-(3,4,5-trimethylphenyl)phenol
4-(p-methoxyphenyl)phenol
4-(p-dimethylaminophenyl)phenol
4-(p-trifluoromethylphenyl)phenol
4-(p-mercaptophenyl)phenol
4-(α-naphthyl)phenol
4-(styryl)phenol
4-(2-pyridyl)phenol
4-(3-pyridyl)phenol
4-(4-pyridyl)phenol
4-(2-thienyl)phenol
4-(3-thienyl)phenol The ether derivatives may then be prepared by conventional methods using the suitable alkyl or aralkyl reagent, or the acyl derivatives may be directly made using conventional acylating reagents.

The following are detailed examples which show the preparation of the various compounds described in this invention. They are to be construed as illustrations of said compounds and not as limitations thereof.

Example I–2

4-(p-fluorophenyl) isopropoxy benzene.—4'-fluoro-4-hydroxybiphenyl (0.1 mole) is added to a solution of sodium hydroxide (0.11 mole) in isopropanol (100 ml.), heated to reflux, and treated dropwise with isopropyl iodide (0.1 mole). The completed mixture is stirred and boiled under reflux for 2 hours, evaporated to dryness, dissolved in benzene, washed with water, and the benzene evaporated. The residual solid is then crystallized from ethanolethyl acetate to obtain 4-(p-fluorophenyl)isopropoxy benzene.

When an equimolar amount of 4'-nitro-4-hydroxy-biphenyl is used in place of 4'-fluoro-4-hydroxybiphenyl in the above example, the product obtained is 4-(p-nitrophenyl)isopropoxybenzene.

When an equimolar amount of the 4-arylphenol compounds of Table II, Example I-1, are used in place of 4'-fluoro-4-hydroxybiphenyl in the above example, the corresponding compound of Table I below is prepared.

TABLE I 4-(p-chlorophenyl)isopropoxybenzene
4-(2,6-dichlorophenyl)isopropoxybenzene
4-(p-bromophenyl)isopropoxybenzene
4-(o-methylphenyl)isopropoxybenzene
4-(3,4,5-trimethylphenyl)isopropoxybenzene
4-(p-methoxyphenyl)isopropoxybenzene
4-(p-dimethylaminophenyl)isopropoxybenzene
4-(p-trifluoromethylphenyl)isopropoxybenzene
4-(α-naphthyl)isopropoxybenzene
4-(stryryl)isopropoxybenzene
4-(2-pyridyl)isopropoxybenzene
4-(3-pyridyl)isopropoxybenzene
4-(4-pyridyl)isopropoxybenzene
4-(2-thienyl)isopropoxybenzene
4-(3-thienyl)isopropoxybenzene When methyl iodide, ethylbromide, t-butyliodide and benzyl bromide are used in place of isopropyl iodide in the above example with the appropriate solvent, the corresponding ether products are obtained. A representative list of these compounds is shown in Table II below.

TABLE II 4-(p-fluorophenyl)methoxybenzene
4-(p-fluorophenyl)t-butoxybenzene
4-(p-fluorophenyl)benzyloxybenzene
4-(p-chlorophenyl)methoxybenzene
4-(o-methylphenyl)ethoxybenzene
4-(p-methoxyphenyl)methoxybenzene
4-(p-trifluoromethylphenyl)methoxybenzene
4-($\alpha$-naphthyl)ethoxybenzene
4-styryl-benzyloxybenzene
4-(p-nitrophenyl)methoxybenzene
4-(p-nitrophenyl)benzyloxybenzene
4-(3-pyridyl)methoxybenzene
4-(4-pyridyl)benzyloxybenzene
4-(2-thienyl)ethoxybenzene Example I-3

5-(p-fluorophenyl)-2-isopropoxyphenyl sulfonic acid.—4'-fluoro-4-isopropoxybiphenyl (8.0 g.) is added to sulfuric acid (25 ml., density 1.84) at 20°. The mixture is then heated to 80° with stirring in 10 minutes, held at this temperature for 10 minutes, and poured onto ice. The precipitate of 4-(p-fluorophenyl) - 2 - isopropoxyphenylsulfonic acid is filtered off, washed with water, and dried in vacuo.

When an equimolar amount of the 4-aryl and heteroaryl phenyl ethers of Example I-2 are used in place of 4'-fluoro-4-isopropoxybiphenyl in the above example, the corresponding sulfonic acid of Table I below is prepared.

TABLE I 5-(p-nitrophenyl)-2-isopropoxyphenyl sulfonic acid
5-(p-chlorophenyl)-2-isopropoxyphenyl sulfonic acid
5-(2,6-dichlorophenyl)-2-isopropoxyphenyl sulfonic acid
5-(p-bromophenyl)-2-isopropoxyphenyl sulfonic acid
5-(o-methylphenyl)-2-isopropoxyphenyl sulfonic acid
5-(3,4,5-trimethylphenyl)-2-isopropoxyphenyl sulfonic acid
5-(p-methoxyphenyl)-2-isopropoxyphenyl sulfonic acid
5-(p-dimethylaminophenyl)-2-isopropoxyphenyl sulfonic acid
5-(p-trifluoromethylphenyl)-2-isopropoxyphenyl sulfonic acid
5-($\alpha$-naphthyl)-2-isopropoxyphenyl sulfonic acid
5-styryl-2-isopropoxyphenyl sulfonic acid
5-(2-pyridyl)-2-isopropoxyphenyl sulfonic acid
5-(3-pyridyl)-2-isopropoxyphenyl sulfonic acid
5-(4-pyridyl)-2-isopropoxyphenyl sulfonic acid
5-(2-thienyl)-2-isopropoxyphenyl sulfonic acid
5-(3-thienyl)-2-isopropoxyphenyl sulfonic acid
5-(p-fluorophenyl)-2-methoxyphenyl sulfonic acid
5-(p-fluorophenyl)-2-t-butoxyphenyl sulfonic acid
5-(p-fluorophenyl)-2-benzyloxyphenyl sulfonic acid
5-(p-chlorophenyl)-2-methoxyphenyl sulfonic acid
5-(o-methylphenyl)-2-ethoxyphenyl sulfonic acid
5-(p-methoxyphenyl)-2-methoxyphenyl sulfonic acid
5-(p-trifluoromethylphenyl)-2-methoxyphenyl sulfonic acid
5-($\alpha$-naphthyl)-2-ethoxyphenyl sulfonic acid
5-styryl-2-benzyloxyphenyl sulfonic acid
5-(p-nitrophenyl)-2-methoxyphenyl sulfonic acid
5-(p-nitrophenyl)-2-benzyloxyphenyl sulfonic acid
5-(3-pyridyl)-2-methoxyphenyl sulfonic acid
5-(4-pyridyl)-2-benzyloxyphenyl sulfonic acid
5-(2-thienyl)-2-ethoxyphenyl sulfonic acid.

Example I-4

5-(p-fluorophenyl)-2-hydroxyphenyl sulfonic acid.—5-(p-fluorophenyl)-2-isopropoxyphenyl sulfonic acid (5.0 g.) is dissolved in hot aqueous 48% hydrobromic acid (25 ml.) and the solution heated to reflux for a few minutes, and then cooled to room temperature. The mixture is evaporated to dryness at ~40°/0.1 mm. pressure, and the residue crystallized from aqueous ethanol to yield 4-(p-fluorophenyl)-2-hydroxyphenyl sulfonic acid.

When an equimolar amount of the compounds of Table I Example I-3 are used in place of 5-(p-fluorophenyl)-2-isopropoxyphenyl sulfonic acid in the above example, the corresponding product of Table I below is prepared.

TABLE I 5-(p-nitrophenyl)-2-hydroxyphenylsulfonic acid
5-(p-chlorophenyl)-2-hydroxyphenylsulfonic acid
5-(2,6-dichlorophenyl)-2-hydroxyphenylsulfonic acid
5-(p-bromophenyl)-2-hydroxyphenylsulfonic acid
5-(o-methylphenyl)-2-hydroxyphenylsulfonic acid
5-(3,4,5-trimethylphenyl)-2-hydroxyphenylsulfonic acid
5-(p-methoxyphenyl)-2-hydroxyphenylsulfonic acid
5-(p-dimethylaminophenyl)-2-hydroxyphenylsulfonic acid hydrobromide
5-(p-trifluoromethylphenyl)-2-hydroxyphenylsulfonic acid
5-($\alpha$-naphthyl)-2-hydroxyphenylsulfonic acid
5-styryl-2-hydroxyphenylsulfonic acid
5-(2-pyridyl)-2-hydroxyphenylsulfonic acid
5-(3-pyridyl)-2-hydroxyphenylsulfonic acid
5-(4-pyridyl)-2-hydroxyphenylsulfonic acid
5-(2-thienyl)-2-hydroxyphenylsulfonic acid
5-(3-thienyl)-2-hydroxyphenylsulfonic acid Example I-5

4'-fluoro-4-hydroxybiphenyl (8 g.) is added to sulfuric acid (25 ml., density 1.84) at 20°. The mixture is stirred at 40° for 20 minutes then poured into ice. Precipitated 5-(p-fluorophenyl)-2-hydroxyphenyl sulfonic acid is filtered off, washed with a little water, and dried in vacuo.

When an equimolar amount of the 4-aryl or heteroaryl phenol compounds of Table II, Example I-1, are used in the above example in place of 4'-fluoro-4-hydroxybiphenyl, the corresponding sulfonated product is obtained.

Example II.—5-(p-fluorophenyl)-2-acetoxybenzene sulfonic acid

A mixture of 5-(p-fluorophenyl)-2-hydroxyphenyl sulfonic acid (2 g.), acetic anhydride (4 ml.), and phosphoric acid (0.2 ml.) is heated to 100° for 10 minutes. The mixture is cooled to 80° and water (2 ml.) is added in one portion down the condenser, vigorously decomposing the excess acetic anhydride. More water (10 ml.) is added and the mixture cooled to 0°. Precipitated 5-(p-fluorophenyl)-2-acetoxyphenylsulfonic acid is filtered off, and recrystallized from an anhydrous benzene-cyclohexane mixture.

When an equimolar amount of the compounds of Table I Example I-4 are used in place of 4-(p-fluorophenyl)-2-hydroxyphenyl sulfonic acid, the corresponding product of Table I below is prepared.

TABLE I 5-(p-nitrophenyl)-2-acetoxyphenyl sulfonic acid
5-(p-chlorophenyl)-2-acetoxyphenyl sulfonic acid
5-(2,6-dichlorophenyl)-2-acetoxyphenyl sulfonic acid
5-(p-bromophenyl)-2-acetoxyphenyl sulfonic acid
5-(o-methylphenyl)-2-acetoxyphenyl sulfonic acid
5-(3,4,5-trimethylphenyl)-2-acetoxyphenyl sulfonic acid
5-(p-methoxyphenyl)-2-acetoxyphenyl sulfonic acid
5-(p-dimethylaminophenyl)-2-acetoxyphenyl sulfonic acid
5-(p-trifluoromethylphenyl)-2-acetoxyphenyl sulfonic acid
5-($\alpha$-naphthyl)-2-acetoxyphenyl sulfonic acid
5-(styryl)-2-acetoxyphenyl sulfonic acid
5-(2-pyridyl)-2-acetoxyphenyl sulfonic acid
5-(3-pyridyl)-2-acetoxyphenyl sulfonic acid
5-(4-pyridyl)-2-acetoxyphenyl sulfonic acid
5-(2-thienyl)-2-acetoxyphenyl sulfonic acid
5-(3-thienyl)-2-acetoxyphenyl sulfonic acid When an equimolar amount of propionic anhydride, butyric anhydride, or crotonic anhydride are used in place of acetic anhydride in the above example, the corresponding 5-aryl or heteroaryl-2-propionyloxy, 2-butyryloxy and 2-crotonyloxyphenyl sulfonic acid is prepared. A representative list of these compounds is shown below in Table II.

TABLE II 5-(p-fluorophenyl)-2-propionyloxyphenyl sulfonic acid
5-(p-nitrophenyl)-2-propionyloxyphenyl sulfonic acid
5-(p-trifluoromethylphenyl)-2-propionyloxyphenyl sulfonic acid
5-(α-naphthyl)-2-butyryloxyphenyl sulfonic acid
5-styryl-2-crotonyloxyphenyl sulfonic acid
5-(o-methylphenyl)-2-crotonyloxyphenyl sulfonic acid
5-(4-pyridyl)-2-propionyloxyphenyl sulfonic acid
5-(3-pyridyl)-2-crotonyloxyphenyl sulfonic acid
5-(2-thienyl)-2-butyryloxyphenyl sulfonic acid Example III.—5-(p-fluorophenyl)-2-hydroxyphenyl sulfonamide Example III-1

5-(p-fluorophenyl)-2-isopropoxyphenyl sulfonyl chloride.—Chlorosulfonic acid (0.3 mole) is added slowly to a continuously stirred solution of 4'-fluoro-4-isopropoxybiphenyl (0.1 mole) in carbon tetrachloride (200 ml.) at a rate which does not allow the internal temperature to rise above 25° (cool if necessary). The mixture on completion is stirred for an additional two hours at room temperature, then stirred vigorously with crushed ice (100 g.) for one minute. The carbon tetrachloride layer is quickly separated, washed once with dilute aqueous sodium carbonate, dried for a few minutes over magnesium sulfate, filtered, and evaporated in vacuo, leaving 5-(p-fluorophenyl)-2-isopropoxyphenyl sulfonyl chloride of sufficient purity to be used directly in the following Examples III-2 and V-1.

When the compounds of Example I-2 are used in place of 4'-fluoro-4-isopropoxybiphenyl in the above example, the corresponding chlorosulfonated product is prepared.

Example III-2

5-(p-fluorophenyl)-2-isopropoxyphenyl sulfonamide.—5-(p-fluorophenyl)-2-isopropoxyphenyl sulfonyl chloride (2 g.) is vigorously shaken with an excess of concentrated aqueous ammonia (10 ml.) at room temperature for 5 minutes. The mixture is diluted with water (10 ml.) and 5-(p-fluorophenyl)-2-isopropoxyphenyl sulfonamide is filtered off, washed with water, and recrystallized from aqueous ethanol.

When the sulfonyl chloride compounds of Example 6 are used in place of 5-(p-fluorophenyl)-2-isopropoxyphenyl sulfonyl chloride in the above example, the corresponding sulfonamides are prepared.

When methylamine, dimethylamine, cyclopropylamine, cyclohexylamine, aniline, benzylamine, piperidine, morpholine, piperazine, homopiperazine or pyrrolidine are used in place of ammonia in the above example, the corresponding sulfonamides are prepared. A representative list is shown below.

N-methyl 5-(p-fluorophenyl)-2-isopropoxyphenyl sulfonamide
N,N-dimethyl 5-(p-nitrophenyl)-2-methoxyphenyl sulfonamide
N-cyclopropyl 5-(p-chlorophenyl)-2-isopropoxyphenyl sulfonamide
N-phenyl 5-(o-methylphenyl)-2-ethoxyphenyl sulfonamide
N,N-diphenyl 5-(p-methoxyphenyl-2-isopropoxyphenyl sulfonamide
N-benzyl 5-(p-dimethylaminophenyl)-2-isopropoxyphenyl sulfonamide
N-piperidino 5-(α-naphthyl)-2-ethoxyphenyl sulfonamide
N-morpholino 5-styryl-2-benzyloxyphenyl sulwonamide
N-piperazino 5-(p-fluorophenyl)-2-t-butoxyphenyl sulfonamide
N-homopiperazino 5-(p-trifluoromethylphenyl)-2-isopropoxyphenyl sulfonamide
N-pyrrolidino 5-(p-fluorophenyl)-2-benzyloxyphenyl sulfonamide
N,N-dimethyl 5-(4-pyridyl)-2-isopropoxyphenyl sulfonamide
N-piperazino 5-(3-pyridyl)-2-methoxyphenyl sulfonamide
N,N-dicyclohexyl 5-(2-thienyl)-2-isopropoxyphenyl sulfonamide Example III-3

5-(p-fluorophenyl)-2-hydroxyphenyl sulfonamide.—5-(p-fluorophenyl)-2-isopropoxyphenyl sulfonamide (2 g.) is dissolved in hot aqueous 48% hydrobromic acid (20 ml.). The solution is rapidly heated to reflux for 2 minutes, and cooled at once to room temperature. The mixture is evaporated to dryness at <20°/0.1 mm. pressure, and the residual 5-(p-fluorophenyl)-2-hydroxyphenyl sulfonamide recrystallized from aqueous ethanol.

When the sulfonamides of Example III-2 are used in the above example in place of 5-(p-fluorophenyl)-2-isopropoxyphenyl sulfonamide, the corresponding product below is prepared.

N-methyl-5-(p-fluorophenyl)-2-hydroxyphenyl sulfonamide
N,N-dimethyl 5-(p-nitrophenyl)-2-hydroxyphenyl sulfonamide
N-cyclopropyl 5-(p-chlorophenyl)-2-hydroxyphenyl sulfonamide
N-phenyl 5-(o-methylphenyl)-2-hydroxyphenyl sulfonamide
N,N-diphenyl 5-(p-methoxyphenyl)-2-hydroxyphenyl sulfonamide
N-benzyl 5-(p-dimethylaminophenyl)-2-hydroxyphenyl sulfonamide
N-piperidino 5-(α-naphthyl)-2-hydroxyphenyl sulfonamide
N-morpholino 5-styryl-2-hydroxyphenyl sulfonamide
N-piperazino 5-(p-fluorophenyl)-2-hydroxyphenyl sulfonamide
N-homopiperazino 5-(p-trifluoromethylphenyl)-2-hydroxyphenyl sulfonamide
N-pyrrolidino 5-(p-fluorophenyl)-2-hydroxyphenyl sulfonamide
N,N-dimethyl 5-((4-pyridyl)-2-hydroxyphenyl sulfonamide
N-piperazino 5-(3-pyridyl)-2-hydroxyphenyl sulfonamide
N,N-dicyclohexyl 5-(2-thienyl)-2-hydroxyphenyl sulfonamide Example IV.—5-(p-fluorophenyl)-2-acetoxyphenyl sulfonamide A mixture of 5-(p-fluorophenyl)-2-hydroxyphenyl sulfonamide (2 g.), acetic anhydride (4 ml.) and phosphoric acid (0.2 ml.) is heated to 100° for 10 minutes. The mixture is cooled to 80° and water (2 ml.) added in one portion down the condenser. When the excess of acetic anhydride has decomposed more water (10 ml.) is added and the mixture cooled to 0°. Precipitated 5-(p-fluorophenyl)-2-acetoxyphenyl sulfonamide is filtered off, and is recrystallized from an anhydrous benzene-cyclohexane mixture.

When the sulfonamides of Example III-3 are used in place of 5-(p-fluorophenyl)-2-hydroxyphenyl sulfonamide in the above example, the corresponding product below is prepared.

N-methyl 5-(p-fluorophenyl)-2-acetoxyphenyl sulfonamide
N,N-dimethyl 5-(p-nitrophenyl)-2-acetoxyphenyl sulfonamide N-cyclopropyl 5-(p-chlorophenyl)-2-acetoxyphenyl sulfonamide
N-phenyl 5-(o-methylphenyl)-2-acetoxyphenyl sulfonamide
N,N-diphenyl 5-(p-methoxyphenyl)-2-acetoxyphenyl sulfonamide
N-benzyl 5-(p-dimethylaminophenyl)-2-acetoxyphenyl sulfonamide
N-piperidino 5-(α-naphthyl)-2-acetoxyphenyl sulfonamide
N-morpholino 5-styryl-2-acetoxyphenyl sulfonamide
N-piperazino 5-(p-fluorophenyl)-2-acetoxyphenyl sulfonamide
N-homopiperazino 5-(p-trifluoromethylphenyl)-2-acetoxyphenyl sulfonamide
N-pyrrolidino 5-(p-fluorophenyl)-2-acetoxyphenyl sulfonamide
N,N-dimethyl 5-(4-pyridyl)-2-acetoxyphenyl sulfonamide
N-piperazino 5-(3-pyridyl)-2-acetoxyphenyl sulfonamide
N,N-dicyclohexyl 5-(2-thienyl)-2-acetoxyphenyl sulfonamide When propionic anhydride, butyric anhydride and crotonic anhydride are used in place of acetic anhydride the corresponding product is prepared.

Example V.—Methyl 5-(p-fluorophenyl)-2-acetoxyphenyl sulfonate

Example V-1

Methyl 5-(p-fluorophenyl)-2-isopropoxyphenyl sulfonate.—5 - (p-fluorophenyl)-2-isopropoxyphenyl sulfonyl chloride (0.01 mole) is added in one portion to a solution of sodium methoxide (0.01 mole) in methanol (20 ml.) at room temperature. The mixture is stirred at room temperature for 30 minutes then evaporated to dryness in vacuo. The product is extracted from contaminating sodium chloride with anhydrous benzene. Evaporation of the benzene in vacuo leaves 5-(p-fluorophenyl)-2-isopropoxyphenyl sulfonic acid methyl ester.

When the compounds of Example III–1 are used in place of 5-(p-fluorophenyl)-2-isopropoxyphenyl sulfonylchloride the corresponding methyl esters are prepared.

In the above example, when the sodium salts of ethanol, butanol, benzyl alcohol and phenol are used in place of sodium methoxide along with the appropriate alcohol in place of methanol, the corresponding sulfonic acid ester is prepared. A representative list of the compounds prepared is shown below.

methyl 5-(p-fluorophenyl)-2-methoxyphenyl sulfonate
ethyl 5-(p-nitrophenyl)-2-methoxyphenyl sulfonate
benzyl 5-(p-nitrophenyl)-2-benzyloxyphenyl sulfonate
methyl 5-(α-naphthyl)-2-isopropoxyphenyl sulfonate
butyl 5-(p-dimethylaminophenyl)-2-isopropoxyphenyl sulfonate
phenyl 5-(p-fluorophenyl)-2-isopropoxyphenyl sulfonate
methyl 5-(p-trifluoromethylphenyl)-2-methoxyphenyl sulphonate
methyl 5-(p-methoxyphenyl)-2-isopropoxyphenyl sulfonate
ethyl 5-(o-methylphenyl)-2-ethoxyphenyl sulfonate
methyl 5-(p-mercaptophenyl)-2-isopropoxyphenyl sulfonate
methyl 5-(4-pyridyl)-2-isopropoxyphenyl sulfonate
benzyl 5-(3-pyridyl)-2-methoxyphenyl sulfonate
phenyl 5-(4-pyridyl)-2-benzyloxyphenyl sulfonate
methyl 5-(2-thienyl)-2-ethoxyphenyl sulfonate
ethyl 5-(3-thienyl)-2-isopropoxyphenyl sulfonate Example V-2

Methyl 5 - (p - fluorophenyl) - 2 - acetoxyphenyl sulfonate.—A solution/suspension of 5-(p-fluorophenyl)-2-acetoxyphenyl sulfonic acid silver salt (prepared by adding an excess of silver nitrate to an aqueous solution of sulfonic acid and filtering off the precipitated salt) in a large excess of methyl iodide is stirred and refluxed for 1 hour. Silver salts are filtered off and solvent removed in vacuo leaving methyl 5-(p-fluorophenyl)-2-acetoxyphenyl sulfonate.

When the sulfonic acids of Examples I–4 and II are used in place of 5-(p-fluorophenyl)-2-acetoxyphenyl sulfonic acid the corresponding methyl esters are prepared.

When ethyliodide, butyliodide, benzyliodide, phenethyl iodide and phenyl lithium are used in place of methyl iodide in the above example, the corresponding 2-acetoxy sulfonic acid ester is prepared. A representative list of the compounds prepared is shown below.

benzyl 5-(p-fluorophenyl)-2-acetoxyphenyl sulfonate
methyl 5-(p-nitrophenyl)-2-acetoxyphenyl sulfonate
methyl 5-(o-methylphenyl)-2-acetoxyphenylsulfonate
methyl 5-(p-methoxyphenyl)-2-acetoxyphenyl sulfonate
methyl 5-(p-dimethylaminophenyl)-2-acetoxyphenyl sulfonate
methyl 5-(α-naphthyl)-2-acetoxyphenyl sulfonate
methyl 5-(styryl)-2-acetoxyphenyl sulfonate
phenyl 5-(p-fluorophenyl)-2-acetoxyphenyl sulfonate
ethyl 5-(p-chlorophenyl)-2-acetoxyphenyl sulfonate
phenethyl 5-(3,4,5-trimethylphenyl)-2-acetoxyphenyl sulfonate
methyl 5-(p-mercaptophenyl)-2-acetoxyphenyl sulfonate
methyl 5-(p-trifluoromethylphenyl)-2-acetoxyphenyl sulfonate
butyl 5-(p-fluorophenyl)-2-acetoxyphenyl sulfonate
methyl 5-(p-nitrophenyl)-2-hydroxyphenyl sulfonate
benzyl 5-(p-fluorophenyl)-2-hydroxyphenyl sulfonate
ethyl 5-(p-methoxyphenyl)-2-hydroxyphenyl sulfonate
methyl 5-(α-naphthyl)-2-hydroxyphenyl sulfonate
ethyl 5-styryl-2-hydroxyphenyl sulfonate
methyl 5-(4-pyridyl)-2-hydroxyphenyl sulfonate
phenyl 5-(3-pyridyl)-2-hydroxyphenyl sulfonate
benzyl 5-(2-thienyl)-2-hydroxyphenyl sulfonate Example VI.—Sodio 5-(p-fluorophenyl)-2-hydroxy phenyl sulfonate To a solution of 0.001 mole of sodium hydroxide in 15 ml. of water is added 0.001 mole of 5-(p-fluorophenyl)-2-hydroxy phenyl sulfonic acid in 10 ml. of ethanol. The mixture is stirred, no need to heat, and evaporated in vacuo to obtain sodio 5-(p-fluorophenyl)-2-hydroxy phenyl sulfonate.

When an equimolar amount of potassium hydroxide, lithium carbonate, aluminum hydroxide, sodium carbonate or calcium hydroxide are used in place of sodium hydroxide the corresponding salt is prepared.

When the 5-(p-fluorophenyl)-2-hydroxy phenyl sulfonic acid of the above procedure is replaced by any of the sulfonic acid compounds of this invention, the corresponding salt is prepared.

When two equivalents of the above bases are used in the above examples, the corresponding di-salt is prepared.

The following representative examples illustrate the interconversion or introduction of functional groups which can be accomplished at various stages of the preparation of the final products.

Ethyl 5-(p-aminophenyl)-2-methoxyphenyl sulfonate.—A mixture of pure ethyl 5-(p-nitrophenyl)-2-methoxyphenyl sulfonate (0.01 mole) in methanol-dioxane (1:1) (ca. 200 ml.) is reacted with hydrogen at room temperature (40 p.s.i.) in the presence of 10% Pd/C (1.0 g.). The mixture is filtered, the cake washed well with methanol, the filtrate evaporated in vacuo, the residue chromatographed on a silica gel column using a methanol-methylene chloride system (v./v. 0–30% methanol) as eluant to yield ethyl 5-(p-aminophenyl)-2-methoxyphenyl sulfonate.

Ethyl 5-(p-hydroxyphenyl) - 2 - methoxyphenyl sulfonate.—A mixture of ethyl 5-(p-aminophenyl)-2-methoxyphenyl sulfonate (0.2 mole), water (600 ml.) and concentrated sulfuric acid (25 ml.) is cooled to 10° C. and a solution of sodium nitrite (0.21 mole) in a minimum of water is added gradually. When the presence of free nitrous acid is detected (starch-iodide paper), the addition is stopped and the diazotization mixture is allowed to warm to room temperature, then heated on a stream-bath until there is no more nitrogen evolution. The mixture is cooled, extracted well with chloroform, the combined chloroform layer dried, concentrated to residue, methanol (300 ml.) added plus 0.5 ml. concentrated sulfuric acid, the mixture heated gently for several hours, the mixture concentrated in vacuo to remove most of the methanol, the residue partitioned between chloroform-dilute sodium bicarbonate solution, the chloroform layer dried, filtered and concentrated to a residue. Chromatography of the residue on a silica gel column using an ether-petroleum ether (v./v. 0–100% ether) system as eluant yields ethyl 5-(p-hydroxyphenyl)-2-methoxyphenyl sulfonate.

Methyl 5-(p-methylthiophenyl)-2-isopropoxyphenyl sulfonate.—A mixture of methyl 2-(p-mercaptophenyl)-2-isopropoxyphenyl sulfonate (0.01 mole) in a deaerated aqeuous KOH solution (0.1 mole) is treated with dimethylsulfate (0.012 mole) at room temperature over one hour, the mixture acidified, extracted well with ether, and the dried ether extracts chromatographed on a silica gel column using an ether-petroleum ether system (v./v. 0–30% ether) as eluant yielding methyl 5-(p-methylthiophenyl)-2-isopropoxyphenyl sulfonate.

Methyl 5-(p-methylsulfinylphenyl)-2-isopropoxyphenyl sulfonate.—To an ice-cooled solution of methyl 5-(p-methylthiophenyl)-2-isopropoxyphenyl suflonate (0.01 mole) in methanol-acetone is added a solution of sodium meta-periodate (0.01 mole) in a minimum of water, and the mixture stirred at 0–8% C. until precipitation of sodium iodate is completed. The iodate is removed by filtration, the solvents removed in vacuo, and the residue taken up in cholroform and ether. The combined organic extracts are dried, filtered and concentrated. Purification of the methyl 5-(p-methylsulfinylphenyl)-2-isopropoxyphenyl sulfonate is affected via recrystallization or chromatography (silica gel) of its methyl ester.

We claim:

1. A method of treating inflammation which comprises the adiministration to a patient of an effective amount of a compound of the formula

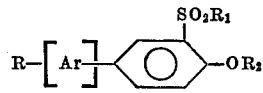

where

Ar is phenyl containing one or more R substituents which which may be at any position on the ring;

R is hydrogen, lower alkyl, lower alkenyl, halogen, haloloweralkyl, hydroxy, lower alkoxy, nitro, amino, lower alkylamino, di(lower alkyl)amino, mercapto, lower alkylthio, lower alkylsulfonyl, lower alkylsulfenyl or sulfamyl;

$R_1$ is

where $R_3$ and $R_4$ may be the same or different and are hydrogen, lower alkyl, lower cycloakyl, phenyl, or phenyl, or phenyl-lower alkyl; and $R_2$ is hydrogen, lower alkyl, lower alkanoyl, or phenyl-lower alkyl.

2. The method of claim 1 wherein R is halo, $R_1$ is

wherein $R_3$ and $R_4$ are hydrogen or lower alkyl, and $R_2$ is hydrogen or lower alkanoyl.

3. The method of claim 1 wherein the compound is 5-(p-fluorophenyl)-2-hydroxyphenyl sulfonamide.

4. The method of claim 1 wherein the compound is 5-(p-fluorophenyl)-2-acetoxphenyl sulfonamide.

References Cited

UNITED STATES PATENTS 2,828,334   3/1968   De Groote _____ 260—512 R

STANLEY J. FRIEDMAN, Primary Examiner

U.S. Cl. X.R.

424—303, 247, 250, 263, 267, 275, 311, 321, 324; 260—239, 247.1, 268, 293.4, 294.8, 326.3, 326.5, 332.2, 332.3, 448, 479, 509, 512